United States Patent
Amano et al.

(10) Patent No.: US 9,417,361 B2
(45) Date of Patent: Aug. 16, 2016

(54) OPTICAL ELEMENT, AND OPTICAL SYSTEM AND OPTICAL APPARATUS USING SAME

(75) Inventors: Sayoko Amano, Utsunomiya (JP); Kazuhiko Momoki, Koshigaya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1066 days.

(21) Appl. No.: 13/549,573

(22) Filed: Jul. 16, 2012

(65) Prior Publication Data

US 2013/0034711 A1 Feb. 7, 2013

(30) Foreign Application Priority Data

Aug. 2, 2011 (JP) ................. 2011-169008

(51) Int. Cl.
*B32B 7/02* (2006.01)
*G02B 1/118* (2015.01)
(52) U.S. Cl.
CPC ......... *G02B 1/118* (2013.01); *Y10T 428/24942* (2015.01); *Y10T 428/24975* (2015.01)
(58) Field of Classification Search
CPC .............................................. G02B 1/10–1/18
See application file for complete search history.

(56) References Cited

U.S. PATENT DOCUMENTS

| 7,663,686 | B2* | 2/2010 | Chen | 348/335 |
| 2004/0253427 | A1* | 12/2004 | Yokogawa et al. | 428/212 |
| 2009/0128915 | A1* | 5/2009 | Weng | G02B 5/02 359/601 |

FOREIGN PATENT DOCUMENTS

| JP | 2004258267 A | 9/2004 | |
| JP | 2005352303 A | 12/2005 | |
| JP | 2006151800 A | 6/2006 | |
| JP | 1701180 A1 * | 9/2006 | ........ B32B 17/10018 |
| JP | 2007052345 A | 3/2007 | |
| JP | 2008056837 A * | 3/2008 | |
| JP | 2009211078 A | 9/2009 | |
| JP | 2010160262 A | 7/2010 | |

OTHER PUBLICATIONS

Machine translation of JP2008056837. Retrieved Feb. 4, 2016.*
Office Action issued in JP2011-169008, mailed Apr. 7, 2015. English translation provided.

* cited by examiner

*Primary Examiner* — Prashant J Khatri
(74) *Attorney, Agent, or Firm* — Rossi, Kimms & McDowell LLP

(57) ABSTRACT

The optical element of the present invention has an anti-reflection film formed on a substrate. The anti-reflection film comprises a low refractive index layer that is formed by mutually binding hollow fine particles, each of which has a vacancy therein, using a binder, and the low refractive index layer consists of a first layer serving as an outermost layer and a second layer which is adjacent to the first layer and is located on the substrate side. Here, the filling ratio of the binder to the first layer is lower than the filling ratio of the binder to the second layer, the refractive index of the first layer is 1.1 or more but not more than 1.25 and the refractive index of the second layer is 1.26 or more but not more than 1.35.

10 Claims, 4 Drawing Sheets

OPTICAL ELEMENT, AND OPTICAL SYSTEM AND OPTICAL APPARATUS USING SAME

BACKGROUND OF THE INVENTION

1. Field of the Invention

The present invention relates to an optical element, and an optical system and an optical apparatus using the same.

2. Description of the Related Art

Conventionally, an anti-reflection film for increasing the amount of transmitted light and avoiding the occurrence of ghost and flare caused by unwanted light has been coated on one side or both sides of the optical element employed in the imaging optical system provided in a photographing lens for use in an optical apparatus such as a video camera, a photographic camera, a television camera, or the like. In particular, for adaptation to high resolution such as high-definition (HD) of recent video cameras and television cameras and high image quality of recent photographic cameras, there is also a growing need for higher anti-reflection performance. Here, in order to obtain high anti-reflection performance, a material which is used for the outermost layer of an anti-reflection film needs to be a material having a low refractive index. Examples of such material having a low refractive index include inorganic materials such as silica, magnesium fluoride, or the like or organic materials such as silicone resin, amorphous fluorine resin, or the like. Furthermore, there is also a technology for lowering a refractive index by forming gaps within a layer made of silica or magnesium fluoride. For example, when gaps (30% of total volume) are provided within the thin film layer made of magnesium fluoride having a refractive index of 1.38, the refractive index can be lowered to 1.27. As a method for forming gaps within such a layer, Japanese Patent Laid-Open No. 2006-151800 discloses a method for manufacturing an anti-reflection film (silica aerogel film) by using a low refractive index material which is formed of silica fine particles or magnesium fluoride fine particles together with a binder with gaps being formed between fine particles. In contrast, Japanese Patent Laid-Open No. 2004-258267 discloses an anti-reflection film having a low refractive index layer which is formed of hollow fine particles, each of which has a vacancy therein, held together by a binder with binding between fine particles being enhanced by filling a space between hollow fine particles with another binder, and a method for manufacturing the same.

Here, in the anti-reflection film disclosed in Japanese Patent Laid-Open No. 2004-258267, hollow fine particles are highly filled in a low refractive index layer and binding between hollow fine particles is enhanced by filling gaps between hollow fine particles with a binder so as to ensure a low refractive index with the aid of a vacancy provided inside each of the hollow fine particles. However, a highly-filled binder may cause an undesirable increase in refractive index.

SUMMARY OF THE INVENTION

Accordingly, the present invention provides an optical element that exhibits excellent scratch resistance and high anti-reflection performance while ensuring a low refractive index.

According to an aspect of the present invention, an optical element having an anti-reflection film formed on a substrate is provided wherein the anti-reflection film comprises a low refractive index layer that is formed by mutually binding hollow fine particles, each of which has a vacancy therein, using a binder, the low refractive index layer consists of a first layer serving as an outermost layer and a second layer which is adjacent to the first layer and is located on the substrate side, the filling ratio of the binder to the first layer is lower than the filling ratio of the binder to the second layer, the refractive index of the first layer is 1.1 or more but not more than 1.25, and the refractive index of the second layer is 1.26 or more but not more than 1.35.

According to the present invention, an optical element that exhibits excellent scratch resistance and high anti-reflection performance while ensuring a low refractive index may be provided.

Further features of the present invention will become apparent from the following description of exemplary embodiments with reference to the attached drawings.

DESCRIPTION OF THE EMBODIMENTS

Hereinafter, preferred embodiments of the present invention will be described with reference to the drawings.

(First Embodiment)

Figure 1:
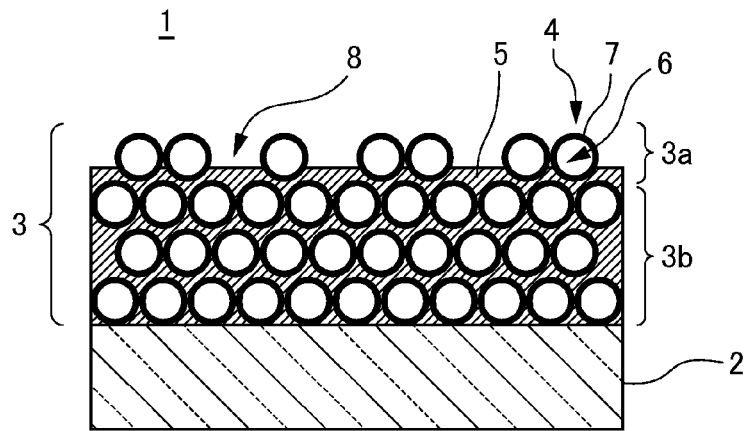
FIG. 1 is a diagram illustrating the configuration of an optical element according to a first embodiment of the present invention.

Firstly, a description will be given of an optical element according to a first embodiment of the present invention. FIG. 1 is a schematic cross sectional view illustrating the configuration of an optical element 1 according to the present embodiment. The optical element 1 includes a light-transmissive substrate (substrate) 2 and a low refractive index layer 3, i.e., an anti-reflection film, formed on the surface of the substrate 2 (on the substrate). Here, the term "anti-reflection film" refers to a film for increasing the amount of transmitted light and avoiding the occurrence of ghost and flare caused by unwanted light, which is formed on one side or both sides of the optical element employed in the imaging optical system of a photographing lens for use in an optical apparatus such as a video camera or the like. Firstly, the substrate 2 is a transparent member that consists of a glass such as quartz and a resin. For ease of explanation, the shape of the substrate 2 is a flat plate (plane) in FIG. 1, but may also be a curved plate or a film-like plate. In addition, the surface of the substrate 2, on which the low refractive index layer 3 is formed, may also be a curved surface, a concave surface, or a convex surface.

The low refractive index layer 3 consists of a film in which multiple hollow fine particles 4 are mutually bound by a binder 5. Each of the hollow fine particles 4 consists of a shell 7 having a vacancy 6 therein. Each of the hollow fine particles 4 is provided with characteristics for lowering a refractive index with the aid of air (refractive index 1.0) included in the vacancy 6. The vacancy 6 may be either a single void or multiple voids and may be appropriately selected. Furthermore, the material of the shell 7 may preferably be the one exhibiting a low refractive index. Examples of such material include organic resins such as $SiO_2$ (silica), $MgF_2$, fluorine, silicone, or the like. $SiO_2$ is more preferred due to ease of manufacturing of particles. Also, the low refractive index layer 3 includes two layers positioned adjacent to each other, i.e., a first layer 3a which is disposed as the outermost layer and has a low filling ratio of the binder 5 to the hollow fine particles 4 and a second layer 3b which is disposed under the outermost layer as a lower layer positioned on the side of the substrate 2 and has a high filling ratio of the binder 5 to the hollow fine particles 4. The filling ratio of the binder 5 can be adjusted by changing a diluted concentration of the binder 5. Firstly, in the first layer 3a, the hollow fine particles 4 are non-uniformly disposed as shown in FIG. 1 and the filling ratio of the binder 5 is low. Thus, the refractive index becomes lower with an increase in the amount of gaps (air) 8 between the hollow fine particles 4. Here, the average particle diameter of the hollow fine particles 4 is preferably 20 nm or more but not more than 70 nm and is more preferably 30 nm or more but not more than 60 nm. The reason is as follows. If the average particle diameter of the hollow fine particles 4 is less than 20 nm, the size of the vacancy 6 becomes small, resulting in difficulty in lowering refractive index, whereas if the average particle diameter of the hollow fine particles 4 is 60 nm or greater, the size of a gap between particles becomes large, resulting in the undesirable occurrence of scattering caused by the size of particles. Further, the film thickness of the first layer 3a is preferably 20 nm or more but not more than 70 nm, whereas the refractive index of the first layer 3a is preferably 1.1 or more but not more than 1.25. Next, in the second layer 3b, the hollow fine particles 4 are bound to each other by filling gaps therebetween with the binder 5. Thus, the strength of the second layer 3b is increased, resulting in ensuring the scratch resistance of the film. Here, the refractive index of the second layer 3b is preferably 1.26 or more but not more than 1.35. Finally, the film thickness of the low refractive index layer 3 is preferably 90 nm or more but not more than 150 nm in order to obtain good anti-reflection performance.

The low refractive index layer 3 is formed as follows. Firstly, a mixed solution of the hollow fine particles 4 and the binder 5 is coated (applied) onto the surface of the substrate 2 using a coating method (wet film formation method) such as a dip-coating method, a spin-coating method, a spray-coating method, a roll coating method, or the like. In particular, in the coating process of the present embodiment, a spin-coating method is preferably employed from the viewpoint that a film can be formed with a uniform film thickness on a substrate having a curved surface such as a lens surface. Next, the mixed solution coated on the substrate 2 is dried. Drying processing is performed using a hot plate, an electric furnace, or the like. As the drying conditions, it is preferable that a temperature and a time may be set such that the organic solvent in the hollow fine particles 4 is capable of being evaporated without affecting the substrate 2. The temperature is preferably, for example, 300° C. or lower. Although it is preferable that the film of the low refractive index layer 3 is usually formed by a single coating process, the film may also be formed by multiple repetitions of a coating process and a drying process.

Next, a description will be given of a material and its numerical value and the effects obtained thereby as a specific example of the optical element 1 of the present embodiment. Firstly, the substrate 2 is a transparent glass substrate having a refractive index for d-ray (587.6 nm) of 1.52. Next, the mixed solution of a hollow $SiO_2$-containing solution and a binder solution (the weight ratio of the hollow $SiO_2$-containing solution/the binder solution =1:0.71) is generated such that the refractive index of the second layer 3b in the low refractive index layer 3 becomes 1.30. At this time, the concentration of the binder solution is adjusted such that the filling ratio of the binder 5 to the first layer 3a of the low refractive index layer 3 becomes lower than the filling ratio of the binder 5 to the second layer 3b. Next, the mixed solution is dropped onto the surface of the substrate 2 and the resulting substrate 2 is subjected to a coating process using a spin coater (3000 rpm, rotation for 30 seconds). Next, after the coating process has been completed, the resulting substrate 2 is subjected to a drying process in a clean oven (200° C., baking for 1 hour). Consequently, the optical element 1 having the low refractive index layer 3 on the substrate 2 is formed.

Figure 2:
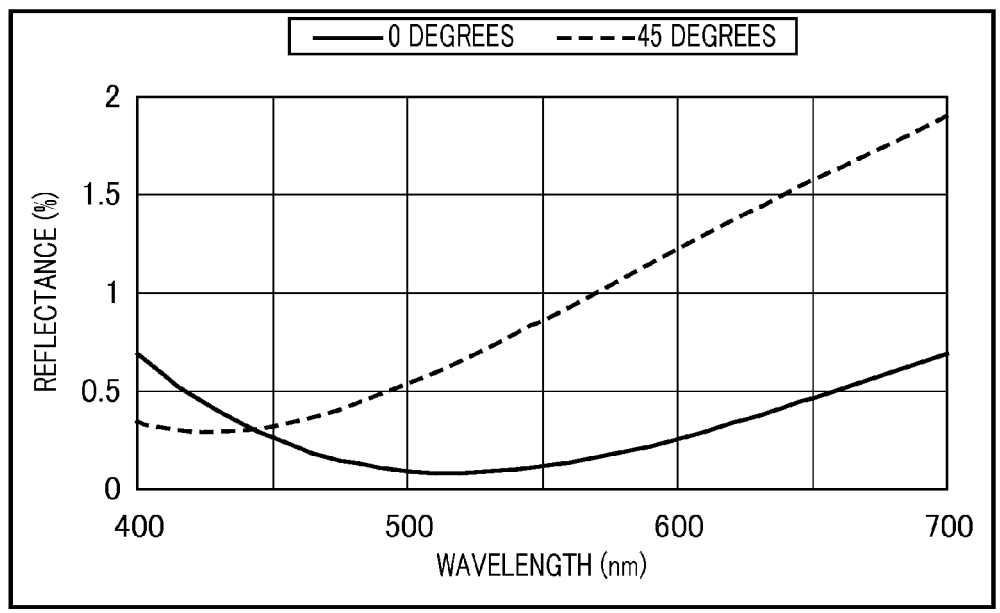
FIG. 2 is a graph illustrating the reflectance characteristics of the optical element according to the first embodiment.

Next, the reflectivity of the optical element 1 was measured at the wavelength of from 400 nm to 700 nm by a reflectivity meter. FIG. 2 is a graph illustrating the reflectance characteristics of the optical element 1 as a result of a reflectivity measurement, where the wavelength (nm) is plotted on the horizontal axis and the reflectivity (%) is plotted on the vertical axis. In FIG. 2, the solid line indicates the reflectance characteristics at the incidence angle of zero degrees, whereas the dotted line indicates the reflectance characteristics at the incidence angle of 45 degrees. As shown in FIG. 2, it can be confirmed that the optical element 1 of the present embodiment has reflectance of 0.7% or less to incident light at zero degrees and reflectance of 2.0% or less to incident light even at 45 degrees over the entire wavelength of from 400 nm to 700 nm, and thus, provides good anti-reflection performance. Also, when the cross-sectional state of the low refractive index layer 3 is observed by a scanning transmission electron microscope, it can be confirmed that the low refractive index layer 3 consists of the first layer 3a and the second layer 3b, both of which have a different filling density of the hollow fine particles 4 (the filling ratio of the binder 5). In the case of this example, it can be confirmed by the cross-sectional observation and reflectivity measurement that the film thickness of the low refractive index layer 3 is 125 nm. Likewise, it can also be confirmed that the refractive index of the first layer 3a is 1.15, the film thickness (physical film thickness) of the first layer 3a is 45 nm, the refractive index of the second layer 3b is 1.30, and the film thickness (physical film thickness) of the second layer 3b is 80 nm. Table 1 shows the refractive indices and the film thicknesses of the layers constituting the optical element 1 in the order from the substrate 2.

TABLE 1

|  | Refractive index ($\lambda$ = 587.6 nm) | Physical film thickness (nm) |
| --- | --- | --- |
| Substrate | 1.52 | — |
| Second layer | 1.30 | 80.0 |
| First layer | 1.15 | 45.0 |
| Air | 1.00 | — |

Furthermore, no scratch was observed on the surface of the low refractive index layer 3 even after a cotton nonwoven cloth was reciprocated twenty times on the surface of the optical element 1 under a load of 300 g/cm$^2$.

As described above, according to the present embodiment, an optical element that exhibits excellent scratch resistance and high anti-reflection performance while ensuring a low refractive index may be provided.

(Second Embodiment)

Next, a description will be given of an optical element according to a second embodiment of the present invention. Although the optical element 1 of the first embodiment only has the low refractive index layer 3 on the substrate 2, the optical element may also be configured such that a single layer or a plurality of layers such as a high refractive index layer, a middle refractive index layer, or the like is provided between the substrate 2 and the low refractive index layer 3. As the high refractive index layer or the middle refractive index layer, for example, a layer containing at least any one of materials selected from the group consisting of zirconium oxide, titanium oxide, tantalum oxide, niobium oxide, hafnium oxide, aluminum, silica, and magnesium fluoride is employed. Furthermore, a layer having functionality such as water repellency or oil repellency may be formed on the surface of the low refractive index layer 3, which is in contact with the external environment. As a material which is used for the functional layer, for example, a fluorine-containing coating solution or a silicone coating solution may be employed. Note that such a refractive index layer or a functional layer may be formed by a vacuum deposition method, a sputtering method, a CVD method, a dip-coating method, a spin-coating method, a spray-coating method, or the like.

Figure 3:
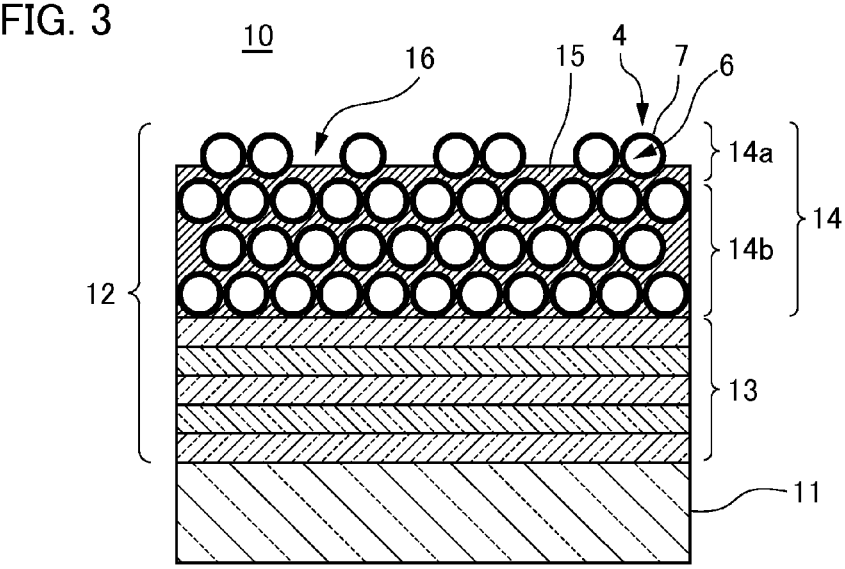
FIG. 3 is a diagram illustrating the configuration of an optical element according to a second embodiment of the present invention.

Next, a description will be given of a material and its numerical value and the effects obtained thereby as a specific example of the optical element of the present embodiment. FIG. 3 is a schematic cross sectional view illustrating the configuration of an optical element 10 according to the present embodiment. Firstly, a substrate 11 is a transparent glass substrate having a refractive index for d-ray (587.6 nm) of 1.806. Next, a multi-layered anti-reflection film 12 which is the feature of the present embodiment is formed on the substrate 11. The multi-layered anti-reflection film 12 includes a multi-layered film 13 constituted by, for example, five layers, and a low refractive index layer 14. The multi-layered film 13 is a five-layer vacuum deposited film in which an inorganic oxide coating having a refractive index for d-ray of 2.11 and an inorganic oxide coating having a refractive index for d-ray of 1.63 are alternately formed on the substrate 11. Next, the low refractive index layer 14 is formed on the multi-layered film 13. Firstly, the mixed solution of a hollow $SiO_2$-containing solution and a binder solution (the weight ratio of the hollow $SiO_2$-containing solution/the binder solution=1:0.71) is generated such that the refractive index of a second layer 14b in the low refractive index layer 14 becomes 1.35. At this time, the concentration of the binder solution is adjusted such that the filling ratio of a binder 15 to a first layer 14a of the low refractive index layer 14 is lower than the filling ratio of the binder 15 to the second layer 14b, that is, a large amount of the gaps 16 is provided between the hollow fine particles 4. Next, the mixed solution is dropped onto the surface of the substrate 11 and the resulting substrate 11 is subjected to a coating process using a spin coater (3000 rpm, rotation for 30 seconds). Next, after the coating process has been completed, the resulting substrate 11 is subjected to a drying process in a clean oven (200620 C., baking for 1 hour). Consequently, the optical element 10 having the multi-layered anti-reflection film 12 including the low refractive index layer 14 on the substrate 11 is formed.

Figure 4:
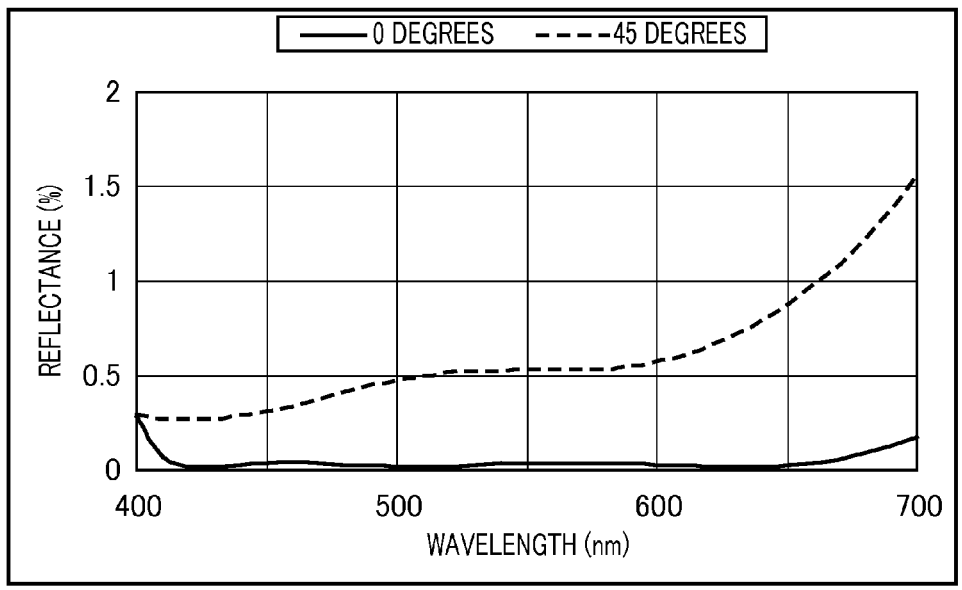
FIG. 4 is a graph illustrating the reflectance characteristics of the optical element according to the second embodiment.

Next, the reflectivity of the optical element 10 was measured at the wavelength of from 400 nm to 700 nm by a reflectivity meter. FIG. 4 is a graph illustrating the reflectance characteristics of the optical element 10 as a result of a reflectivity measurement, where the wavelength (nm) is plotted on the horizontal axis and the reflectivity (%) is plotted on the vertical axis. Also in FIG. 4, the solid line indicates the reflectance characteristics at the incidence angle of zero degrees, whereas the dotted line indicates the reflectance characteristics at the incidence angle of 45 degrees. As shown in FIG. 4, it can be confirmed that the optical element 10 of the present embodiment has reflectance of 0.3% or less at a wavelength of 400 nm, reflectance of 0.1% or less at a wavelength of from 450 nm to 650 nm, and reflectance of 0.2% or less at a wavelength of 700 nm to incident light at zero degrees, and has reflectance of about 1.5% or less to incident light even at 45 degrees over the entire wavelength of from 400 nm to 700 nm, and thus, provides good anti-reflection performance. Also, when the cross-sectional state of the multi-layered anti-reflection film 12 is observed by a scanning transmission electron microscope, it can be confirmed that the low refractive index layer 14 consists of the first layer 14a and the second layer 14b, both of which have a different filling density of the hollow fine particles 4. In the case of this example, it can be confirmed by the cross-sectional observation and reflectivity measurement that the film thickness of the low refractive index layer 14 is 131 nm. Likewise, it can also be confirmed that the refractive index of the first layer 14a is 1.15, the film thickness (physical film thickness) of the first layer 14a is 50 nm, the refractive index of the second layer 14b is 1.35, and the film thickness (physical film thickness) of the second layer 14b is 81 nm. Table 2 shows the refractive indices and the film thicknesses of the layers constituting the optical element 10 in the order from the substrate 11.

TABLE 2

|  | Refractive index (λ = 587.6 nm) | Physical film thickness (nm) |
| --- | --- | --- |
| Substrate | 1.806 | — |
| First layer of multi-layered film | 2.11 | 21.7 |
| Second layer of multi-layered film | 1.63 | 16.7 |
| Third layer of multi-layered film | 2.11 | 78.5 |
| Fourth layer of multi-layered film | 1.63 | 23.1 |
| Fifth layer of multi-layered film | 2.11 | 23.5 |
| Second layer | 1.35 | 81.0 |
| First layer | 1.15 | 50.0 |
| Air | 1.00 | — |

FIRST COMPARATIVE EXAMPLE

Figure 5:
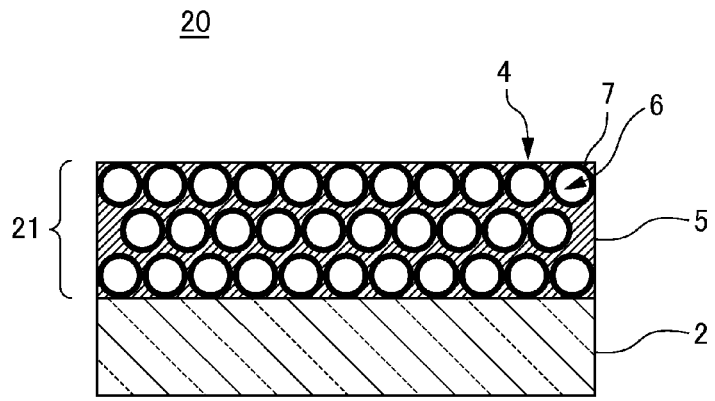
FIG. 5 is a diagram illustrating the configuration of an optical element according to a first comparative example relating to the first embodiment.
Figure 6:
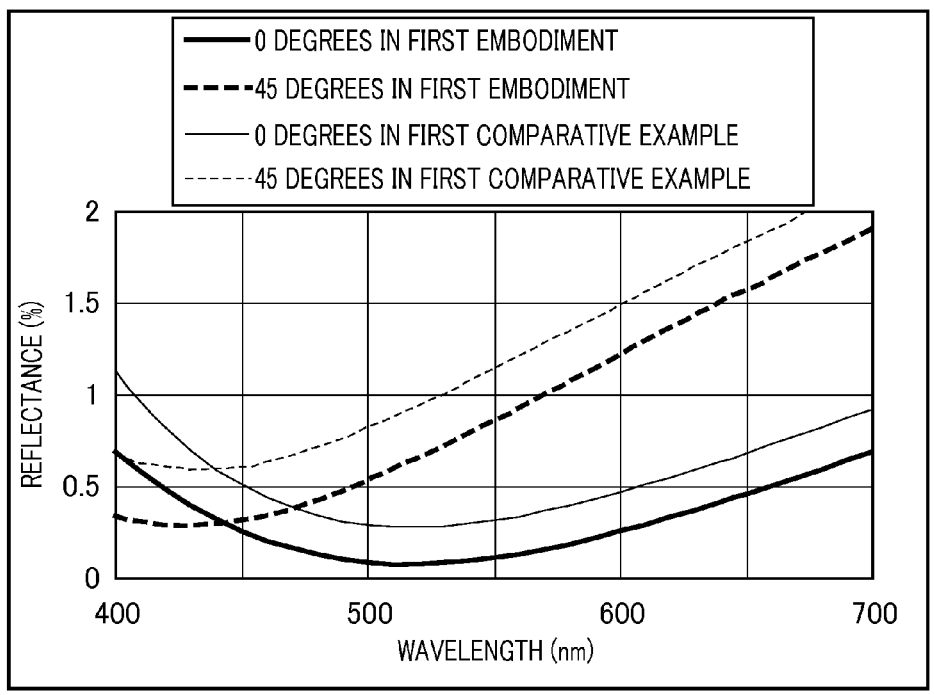
FIG. 6 is a graph illustrating the reflectance characteristics of the optical element according to the first comparative example.

Next, as a reference, a description will be given of an optical element of a first comparative example with respect to the optical element 1 of the first embodiment. FIG. 5 is a schematic cross sectional view illustrating the configuration of an optical element 20 according to a first comparative example relating to the first embodiment. In FIG. 5, the same elements as those in the optical element 1 according to the first embodiment are designated by the same reference numerals, and explanation thereof will be omitted. In contrast to the low refractive index layer 3 of the first embodiment, the optical element 20 has a low refractive index layer 21 consisting of a single film in which the gaps between the hollow fine particles 4 are filled with the binder 5. Firstly, the substrate 2 is the same as that of the first embodiment. Next, the mixed solution of a hollow $SiO_2$-containing solution and a binder solution (the weight ratio of the hollow $SiO_2$-containing solution/the binder solution=1:0.71) is generated such that the refractive index of the low refractive index layer 21 becomes 1.30. At this time, in the low refractive index layer 21, the concentration of the binder solution is adjusted such that the gaps between the hollow fine particles 4 are filled with the binder 5 as described above. Next, as in the first embodiment, a coating process and a drying process are performed, and thus, the optical element 20 having the low refractive index layer 21 on the substrate 2 is formed. Here, the optical element 20 was observed and evaluated as in the first embodiment. Consequently, as shown in FIG. 6, it can be confirmed that the optical element 20 exhibits high reflectivity as compared with the first embodiment, resulting in poor anti-reflection performance. Thus, the usefulness of the optical element 1 according to the first embodiment is indicated. Table 3 shows the refractive indices and the film thicknesses of the layers constituting the optical element 20 in the order from the substrate 2.

TABLE 3

|  | Refractive index ($\lambda$ = 587.6 nm) | Physical film thickness (nm) |
|---|---|---|
| Substrate | 1.52 | — |
| Low refractive index layer | 1.30 | 100.0 |
| Air | 1.00 | — |

SECOND COMPARATIVE EXAMPLE

Figure 7:
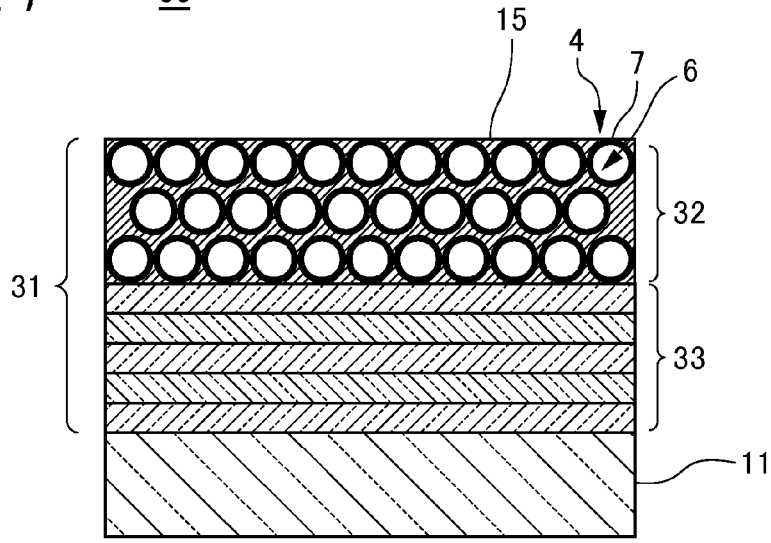
FIG. 7 is a diagram illustrating the configuration of an optical element according to a second comparative example relating to the second embodiment.
Figure 8:
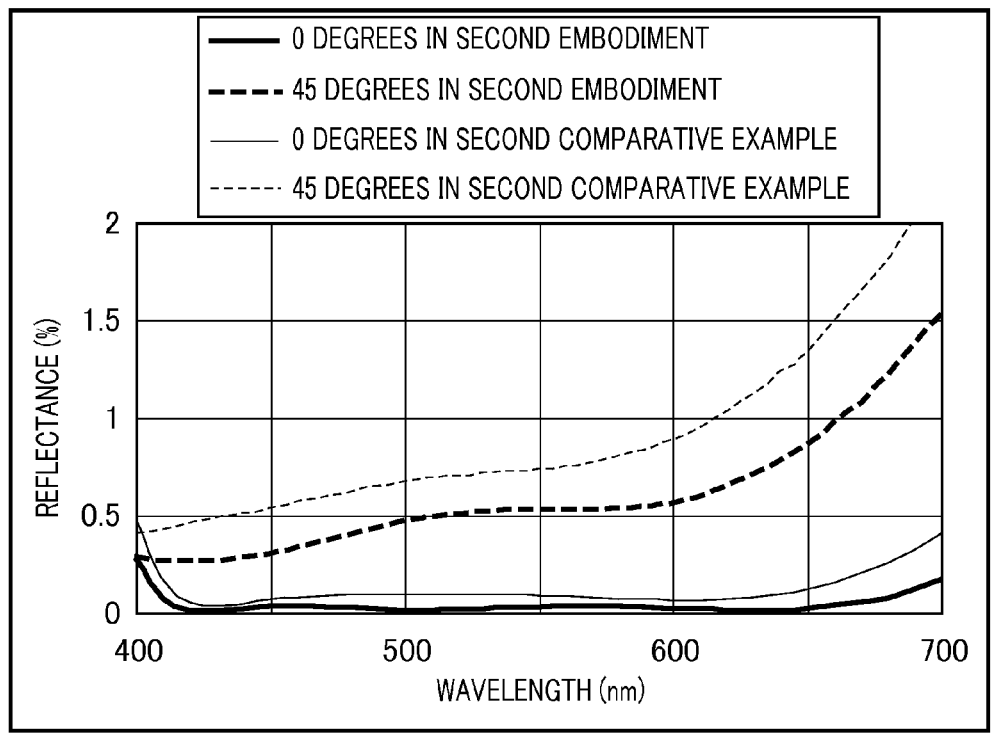
FIG. 8 is a graph illustrating the reflectance characteristics of the optical element according to the second comparative example.

Furthermore, as a reference, a description will be given of an optical element of a second comparative example with respect to the optical element 10 of the second embodiment. FIG. 7 is a schematic cross sectional view illustrating the configuration of an optical element 30 according to a second comparative example relating to the second embodiment. In FIG. 7, the same elements as those in the optical element 10 according to the second embodiment are designated by the same reference numerals, and explanation thereof will be omitted. As in the optical element 10 of the second embodiment, the optical element 30 also includes a multi-layered anti-reflection film 31. In contrast to the low refractive index layer 14, the low refractive index layer 32 according to the second comparative example constituting the multi-layered anti-reflection film 31 consists of a single film in which the gaps between the hollow fine particles 4 are filled with the binder 15. Firstly, the substrate 11 is the same as that of the second embodiment. Also in the second comparative example, the multi-layered anti-reflection film 31 has a multi-layered film 33 constituted by five layers as in the second embodiment. Next, the mixed solution of a hollow $SiO_2$-containing solution and a binder solution (the weight ratio of the hollow $SiO_2$-containing solution/the binder solution=1: 0.71) is generated such that the refractive index of the low refractive index layer 32 becomes 1.35. At this time, in the low refractive index layer 32, the concentration of the binder solution is adjusted such that the gaps between the hollow fine particles 4 are filled with the binder 15 as described above. Next, as in the second embodiment, a coating process and a drying process are performed, and thus, the optical element 30 having the low refractive index layer 32 on the substrate 11 is formed. Here, the optical element 30 was observed and evaluated as in the second embodiment. Consequently, as shown in FIG. 8, it can be confirmed that the optical element 30 exhibits high reflectivity as compared with the second embodiment, resulting in poor anti-reflection performance. Thus, the usefulness of the optical element 10 according to the second embodiment is indicated. Table 4 shows the refractive indices and the film thicknesses of the layers constituting the optical element 30 in the order from the substrate 11.

TABLE 4

|  | Refractive index ($\lambda$ = 587.6 nm) | Physical film thickness (nm) |
|---|---|---|
| Substrate | 1.806 | — |
| First layer of multi-layered film | 2.11 | 18.9 |
| Second layer of multi-layered film | 1.63 | 19.4 |
| Third layer of multi-layered film | 2.11 | 79.7 |
| Fourth layer of multi-layered film | 1.63 | 17.5 |
| Fifth layer of multi-layered film | 2.11 | 28.9 |
| Low refractive index layer | 1.35 | 100.0 |
| Air | 1.00 | — |

(Optical System and Optical Apparatus)

Next, a description will be given of an optical system and an optical apparatus according to one embodiment of the present invention. The optical system of the present embodiment is an imaging optical system which is constructed inside a lens (optical element) or a lens barrel provided in the optical apparatus such as a video camera, a photographic camera, a television camera, or the like. The imaging optical system has at least two or more lenses arranged in the direction of the optical axis and includes, for example, a first lens serving as a cemented lens, a second lens having an anti-reflection film, and the like sequentially from the light incident side. As the second lens, the optical element described in the aforementioned embodiments may be employed. The optical system and the optical apparatus of the present embodiment provide at least an imaging performance in a more advantageous manner than hitherto.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-169008 filed Aug. 2, 2011 which are hereby incorporated by reference herein it their entirety.

What is claimed is:

1. An optical element comprising:
   a substrate; and
   an anti-reflection film on the substrate,
   wherein the anti-reflection film comprises a low refractive index layer including a plurality of hollow fine particles and a binder that binds the hollow fine particles to one another,
   wherein the low refractive index layer consists of a first layer serving as an outermost layer, with a same physical thickness as an average diameter of the hollow fine particles, and a second layer disposed adjacent to the first layer and between the first layer and the substrate,
   wherein each of the plurality of hollow fine particles in the first layer is partially embedded in the binder,
   wherein a filling ratio of the binder to the first layer is lower than a filling ratio of the binder to the second layer,
   wherein a filling ratio of the plurality of hollow fine particles to the first layer is lower than a filling ratio of the plurality of hollow fine particles to the second layer,
   wherein the refractive index in d-line of the first layer is 1.1 or more but not more than 1.25, and
   wherein the refractive index in d-line of the second layer is 1.26 or more but not more than 1.35.

2. The optical element according to claim 1, wherein the hollow fine particles included in the first layer are the same as the hollow fine particles included in the second layer.

3. The optical element according to claim 1, wherein the physical film thickness of the low refractive index layer is 90 nm or more but not more than 150 nm and the film thickness of the first layer is 20 nm or more but not more than 70 nm.

4. The optical element according to claim 1, wherein the average particle diameter of the hollow fine particles is 20 nm or more but not more than 70 nm.

5. The optical element according to claim 1, wherein the material of the hollow fine particles is silica.

6. The optical element according to claim 1, wherein the low refractive index layer is a spin coated index layer.

7. The optical element according to claim 1, wherein each of the plurality of hollow fine particles in the second layer is entirely buried in the binder.

8. The optical element according to claim 1, wherein the anti-reflection film includes at least one layer between the substrate and the low refractive index layer.

9. The optical element according to claim 8, wherein the at least one layer between the substrate and the low refractive index layer is composed of at least any one of materials selected from the group consisting of zirconium oxide, titanium oxide, tantalum oxide, niobium oxide, hafnium oxide, aluminum, silica, and magnesium fluoride.

10. An optical system comprising:
at least two optical elements, with at least one thereof having a substrate and an anti-reflection film on the substrate,
wherein the anti-reflection film comprises a low refractive index layer including a plurality of hollow fine particles and a binder that binds the hollow fine particles to one another,
wherein the low refractive index layer consists of a first layer serving as an outermost layer, with a same physical thickness as an average diameter of the hollow fine particles, and a second layer disposed adjacent to the first layer and between the first layer and the substrate,
wherein each of the plurality of hollow fine particles in the first layer is partially embedded in the binder,
wherein a filling ratio of the binder to the first layer is lower than a filling ratio of the binder to the second layer,
wherein a filling ratio of the plurality of hollow fine particles to the first layer is lower than a filling ratio of the plurality of hollow fine particles to the second layer,
wherein the refractive index in d-line of the first layer is 1.1 or more but not more than 1.25,
wherein the refractive index in d-line of the second layer is 1.26 or more but not more than 1.35.

* * * * *